United States Patent
Kondo et al.

(10) Patent No.: US 10,064,245 B2
(45) Date of Patent: Aug. 28, 2018

(54) JOINING DEVICE AND JOINING METHOD

(71) Applicant: NEWFREY LLC, New Britain, CT (US)

(72) Inventors: Yoshiteru Kondo, Aichi (JP); Daisuke Miura, Aichi (JP)

(73) Assignee: NEWFREY LLC, New Britain, CT (US)

(*) Notice: Subject to any disclaimer, the term of this patent is extended or adjusted under 35 U.S.C. 154(b) by 0 days.

(21) Appl. No.: 15/159,203

(22) Filed: May 19, 2016

(65) Prior Publication Data

US 2016/0262214 A1 Sep. 8, 2016

Related U.S. Application Data

(63) Continuation of application No. PCT/JP2014/068729, filed on Jul. 14, 2014.

(30) Foreign Application Priority Data

Nov. 22, 2013 (JP) ................................. 2013-242007

(51) Int. Cl.
*H05B 6/10* (2006.01)
*B23K 11/02* (2006.01)
(Continued)

(52) U.S. Cl.
CPC .......... *H05B 6/101* (2013.01); *B23K 11/0026* (2013.01); *B23K 11/0053* (2013.01);
(Continued)

(58) Field of Classification Search
CPC ..... B29C 65/562; B29C 65/564; B29C 65/64; B29C 66/1122; B29C 66/21; B29C 66/43;
(Continued)

(56) References Cited

U.S. PATENT DOCUMENTS 2,205,425 A * 6/1940 Leonard, Jr. ........... B23K 13/02
219/608
3,033,102 A * 5/1962 Fryklund ......... H01B 13/01272
100/14
(Continued)

FOREIGN PATENT DOCUMENTS

CN 102794557 A 11/2012
DE 102004025492 A 8/2009
(Continued)

OTHER PUBLICATIONS

European Search Report dated Jun. 21, 2017.
Chinese Office Action dated Sep. 20, 2017.

*Primary Examiner* — Eric Stapleton
(74) *Attorney, Agent, or Firm* — Michael P. Leary

(57) ABSTRACT

A joining device for connecting a metal member and a resign member with a metal fastener including a penetrating tip comprises: a cylindrical nosepiece; a high frequency electromagnetic induction coil around the nosepiece; an electrode punch for pressing the fastener into the resign member; a electronic chopper for producing a high frequency current; a high frequency power supply for supplying an induction current to the induction coil; a welding power supply for supplying a welding current between the electrode punch and the metal member; a contact detector for sensing when the fastener tip touches the metal member; and a switching unit for automatically switching from the induction current to the welding current when the contact detector senses that the tip has contacted the metal member.

16 Claims, 9 Drawing Sheets

(51) Int. Cl.
*B23K 11/24* (2006.01)
*B23K 11/25* (2006.01)
*B23K 11/30* (2006.01)
*H05B 6/36* (2006.01)
*B23K 11/00* (2006.01)
*B23K 11/16* (2006.01)
*B23K 11/36* (2006.01)
*B29C 65/56* (2006.01)
*B29C 65/64* (2006.01)
*B29C 65/00* (2006.01)
*C21D 1/42* (2006.01)

(52) U.S. Cl.
CPC ............. *B23K 11/02* (2013.01); *B23K 11/16* (2013.01); *B23K 11/241* (2013.01); *B23K 11/25* (2013.01); *B23K 11/258* (2013.01); *B23K 11/3009* (2013.01); *B23K 11/36* (2013.01); *B29C 65/562* (2013.01); *B29C 65/564* (2013.01); *B29C 65/64* (2013.01); *B29C 66/1122* (2013.01); *B29C 66/21* (2013.01); *B29C 66/43* (2013.01); *B29C 66/742* (2013.01); *B29C 66/8322* (2013.01); *H05B 6/36* (2013.01); *B29C 66/474* (2013.01); *B29C 66/71* (2013.01); *C21D 1/42* (2013.01); *Y02P 10/253* (2015.11)

(58) Field of Classification Search
CPC ... B29C 66/742; B29C 66/8322; B29C 66/71; B29C 66/474; H05B 6/36; H05B 6/101; B23K 11/3009; B23K 11/25; B23K 11/241; B23K 11/02; B23K 11/36; B23K 11/258; B23K 11/0026; B23K 11/0053; B23K 11/16; Y02P 10/253; C21D 1/42; B29K 2069/00; B29K 2077/00; B29K 2023/06; B29K 2023/12; B29K 2055/02; B29K 2059/00
USPC ....................................................... 219/617
See application file for complete search history.

(56) References Cited

U.S. PATENT DOCUMENTS

| | | | | | |
|---|---|---|---|---|---|
| 3,592,998 | A * | 7/1971 | Derclaye | ................ | B23K 11/16 219/117.1 |
| 3,659,074 | A * | 4/1972 | Friess | ................ | B23K 11/252 219/111 |
| 4,045,644 | A * | 8/1977 | Shafer | ................ | B21J 5/00 148/432 |
| 4,243,368 | A * | 1/1981 | Garabedian | ................ | B29C 37/006 425/405.1 |
| 4,273,581 | A * | 6/1981 | Inoue | ................ | B22F 3/02 100/38 |
| 4,334,850 | A * | 6/1982 | Garabedian | ................ | B29C 37/006 156/285 |
| 4,336,221 | A * | 6/1982 | Garabedian | ................ | B29C 33/10 264/122 |
| 4,353,855 | A * | 10/1982 | Garabedian | ................ | B29C 37/006 264/126 |
| 4,414,028 | A * | 11/1983 | Inoue | ................ | B22F 3/02 100/232 |
| 4,423,617 | A * | 1/1984 | Nippert | ................ | B21C 23/14 29/825 |
| 4,536,366 | A * | 8/1985 | Inoue | ................ | B22F 3/02 100/38 |
| 4,673,784 | A * | 6/1987 | Vickers | ................ | F01L 3/22 219/641 |
| 4,682,487 | A * | 7/1987 | Kaeseler | ................ | B23K 35/402 219/119 |
| 4,804,819 | A * | 2/1989 | Farrow | ................ | B23K 11/06 219/601 |
| 4,916,931 | A * | 4/1990 | Kaeseler | ................ | B23K 35/402 72/355.6 |
| 4,992,133 | A * | 2/1991 | Border | ................ | B29C 65/18 100/156 |
| 5,035,041 | A * | 7/1991 | Matuschek | ................ | B21J 15/02 29/509 |
| 5,296,317 | A * | 3/1994 | Ratte | ................ | H01M 2/307 429/178 |
| 5,373,720 | A * | 12/1994 | Ratte | ................ | H01M 2/307 72/354.8 |
| 5,705,796 | A * | 1/1998 | Hansen | ................ | B29C 65/3656 156/274.2 |
| 6,225,591 | B1 * | 5/2001 | Nippert | ................ | B21J 9/02 219/119 |
| 6,265,701 | B1 * | 7/2001 | Bickel | ................ | B23K 9/00 219/136 |
| 6,515,251 | B1 * | 2/2003 | Wind | ................ | B23K 11/255 219/110 |
| 7,087,854 | B2 * | 8/2006 | Takahashi | ................ | B23K 11/115 219/91.22 |
| 7,176,401 | B2 * | 2/2007 | Sakoda | ................ | B23K 9/201 219/98 |
| 7,877,862 | B2 * | 2/2011 | Cole | ................ | H01J 17/40 269/296 |
| 8,211,268 | B1 * | 7/2012 | Raghavendran | ........ | B29C 65/02 156/307.1 |
| 8,461,484 | B2 | 6/2013 | Tetzlaff et al. | | |
| 8,595,914 | B2 * | 12/2013 | Koppitz | ................ | B23K 9/201 29/525.13 |
| 8,793,860 | B2 | 8/2014 | Kashimura | | |
| 9,067,276 | B2 * | 6/2015 | Koppitz | ................ | B23K 9/207 |
| 9,114,481 | B1 * | 8/2015 | Bruck | ................ | B23K 20/12 |
| 2002/0117565 | A1 * | 8/2002 | Yajima | ................ | B03B 9/06 241/24.2 |
| 2004/0169017 | A1 * | 9/2004 | Sakoda | ................ | B23K 9/201 219/98 |
| 2005/0133483 | A1 * | 6/2005 | Hou | ................ | B23K 11/0066 219/118 |
| 2006/0051540 | A1 * | 3/2006 | Kagawa | ................ | B29C 47/0021 428/35.7 |
| 2006/0057405 | A1 * | 3/2006 | Kagawa | ................ | B29C 47/0021 428/458 |
| 2008/0076351 | A1 * | 3/2008 | Washiro | ................ | H04B 5/0031 455/41.1 |
| 2008/0085568 | A1 * | 4/2008 | Wang | ................ | B23K 9/0026 438/4 |
| 2008/0229570 | A1 * | 9/2008 | Koppitz | ................ | B23K 9/201 29/525.11 |
| 2009/0011269 | A1 * | 1/2009 | Urushihara | ......... | B23K 11/115 428/594 |
| 2009/0122216 | A1 * | 5/2009 | Kogure | ................ | B29C 47/0019 349/58 |
| 2009/0139821 | A1 * | 6/2009 | Koppitz | ................ | B23K 9/20 192/3.29 |
| 2009/0261075 | A1 * | 10/2009 | Aoyama | ................ | B23K 11/0053 219/93 |
| 2009/0294410 | A1 * | 12/2009 | Iwase | ................ | B21J 15/025 219/91.23 |
| 2010/0201032 | A1 * | 8/2010 | Asano | ................ | B29C 43/34 264/299 |
| 2011/0097142 | A1 * | 4/2011 | Bassler | ................ | B23K 11/0046 403/337 |
| 2011/0139353 | A1 * | 6/2011 | Sugiyama | ......... | B29C 65/1635 156/212 |
| 2013/0112664 | A1 | 5/2013 | Erlacher et al. | | |
| 2013/0248083 | A1 * | 9/2013 | Takahashi | ................ | B21J 15/025 156/92 |

FOREIGN PATENT DOCUMENTS

| | | |
|---|---|---|
| DE | 102011009700 A | 11/2011 |
| DE | 102012004499 A | 8/2013 |
| JP | 61082775 U | 6/1986 |

(56) References Cited

FOREIGN PATENT DOCUMENTS

| JP | 61269986 A | 11/1986 |
|----|------------|---------|
| JP | 2093087 U  | 7/1990  |
| JP | 10190243 A | 7/1998  |

\* cited by examiner

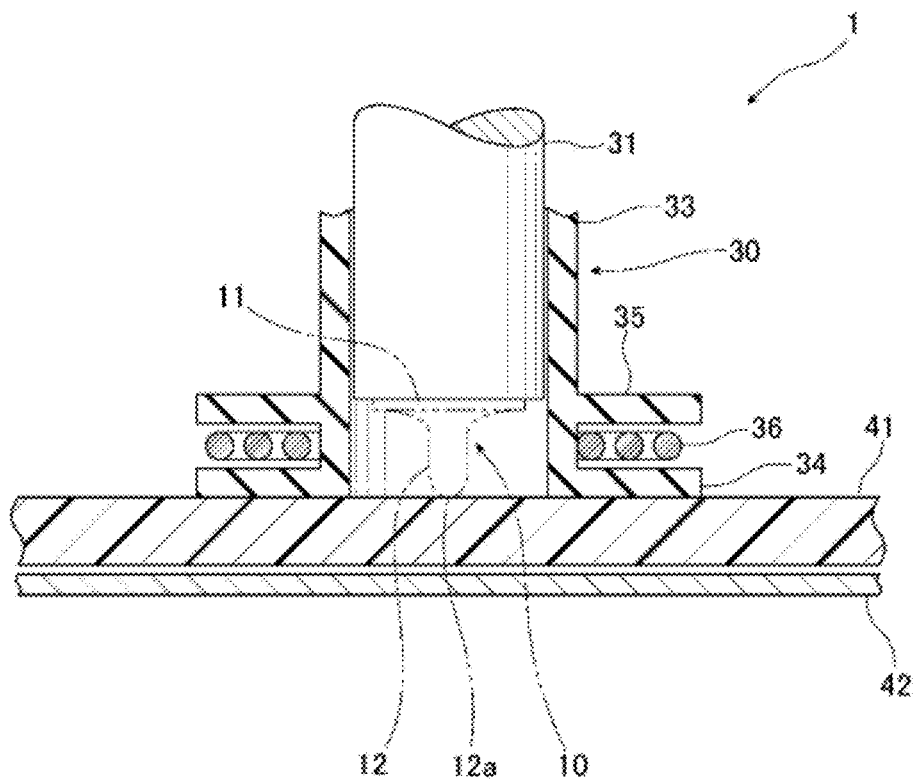
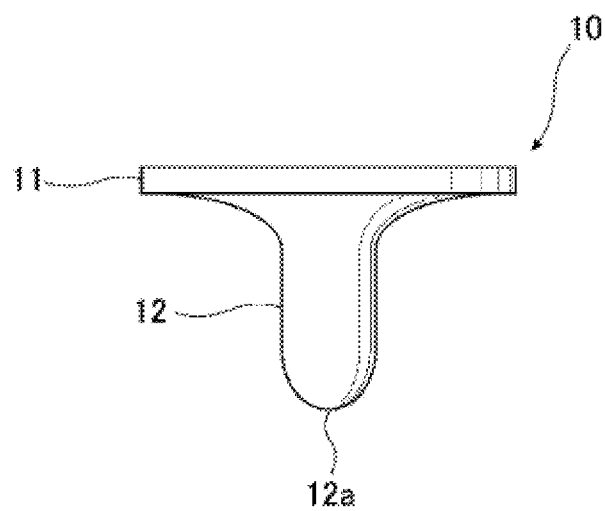

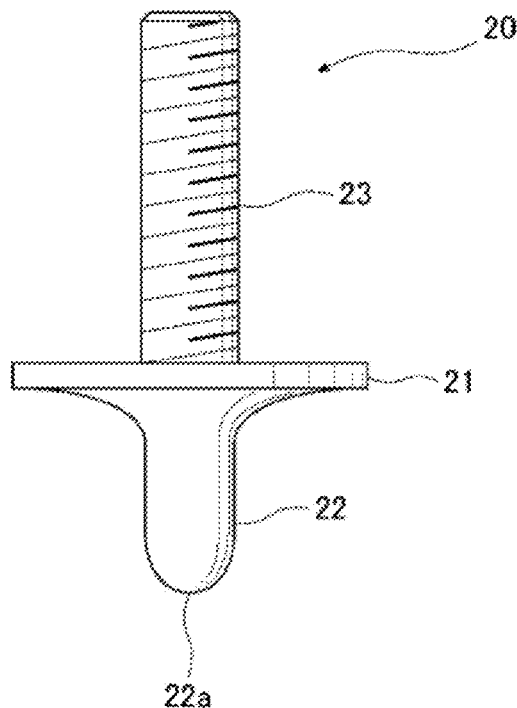
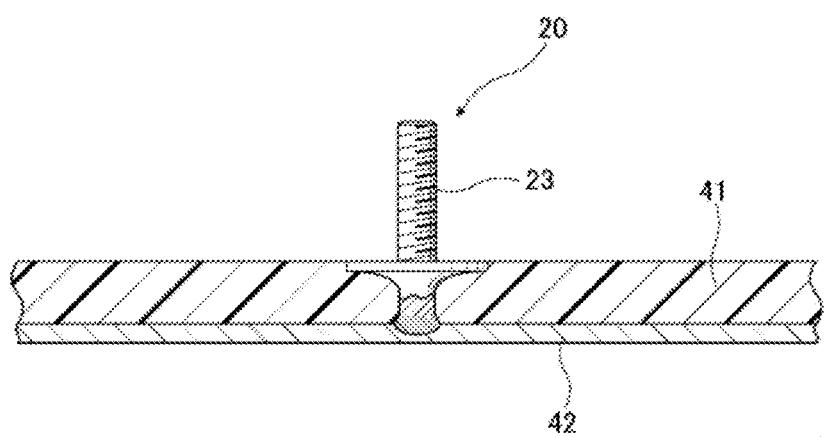

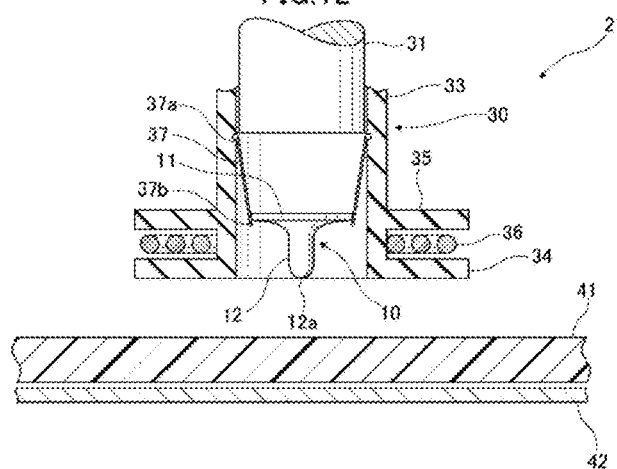
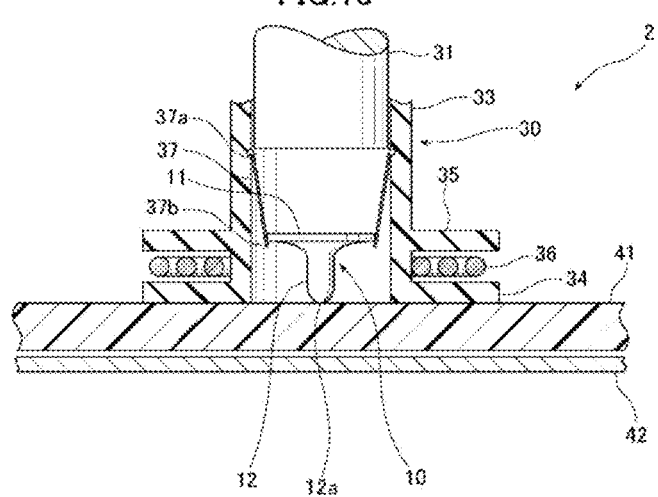
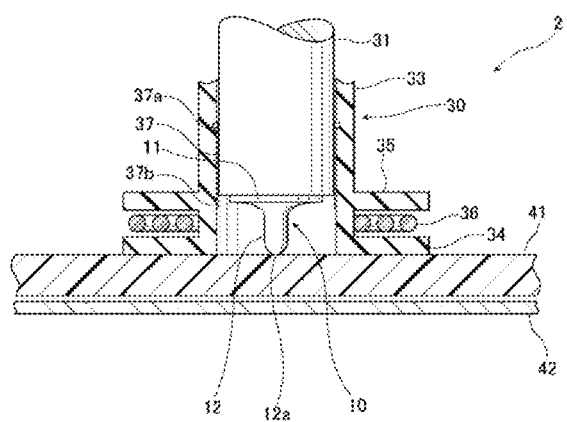

JOINING DEVICE AND JOINING METHOD

CROSS-REFERENCE TO RELATED APPLICATIONS

This application is a continuation of PCT Application No. PCT/JP2014/068729, filed Jul. 14, 2014 which claims priority from Japanese Patent Application No. 2013-242007, filed on Nov. 22, 2013, the disclosures of which are incorporated herein by reference.

BACKGROUND OF THE INVENTION

The present invention pertains to a joining device and joining method for joining a resin member and metal member using a fastener. More particularly, the invention pertains to a joining device and joining method for joining a resin member and metal member whereby a fastener is press-fit from the resin member side, and the fastener and the metal member are welded to join the resin member and the metal member.

Joining methods for joining a resin member and a metal member include screw fastening, rivet punching, adhesion and the like. Screw fastening is accomplished by pre-drilling a swaging hole in a resin member and a metal member, matching the positions of the holes in the resin member and the metal member, inserting a screw into the hole formed in the resin member from the resin member side and affixing the screw by screwing it into the hole formed in the metal member. However, fastening by screw requires formation in advance of screw holes in the resin member and metal member, which is laborious. It is also difficult to match the screw position to the screw holes in the resin member and metal member for screwing in. The presence of the screw hole makes it difficult to maintain waterproofness and air-tightness.

In rivet punching, a rivet is punched in from the resin member side through to the metal member to join the resin member and the metal member. With rivet punching, there is no need to drill holes in the resin member and the metal member; wherefore, the resin member and metal member can be joined in a simple manner. The problem arises, however, that cracks can easily form in the resin member during riveting if the resin member is rigid. It is also easy for gaps to form between the rivet and the resin member and metal member, making it difficult to maintain waterproofness and airtightness.

With adhesion, an adhesive is applied to the resin member and/or the metal member, and the resin member and metal member are laminated and adhered via the adhesive. Adhesion requires pre-drilling of holes in the resin member and the metal member. In adhesion, however, the application of the adhesive is laborious, and processing such as heating or applying pressure and clamping are required to cure the adhesive, thus requiring time.

Japanese published unexamined Patent Application S.61-269986 discloses a method for laminating a non-conductive rigid member and a metal member and inserting a metal fastener from the rigid member side to connect to the metal member. In this method, the rigid member is laminated to the metal member; one electrode on a welding machine main unit is connected to a metal base material, and the other electrode is connected to a pressure member on a press brake. A cylindrical metal fastener is press-fit from the surface of a rigid member toward a metal base material by the pressuring member on a press. Electricity is applied to perform welding between the two when the tip portion of the cylindrical metal fastener reaches the metal member.

Prior art JP S.61-269986 describes continued press-fitting of a metal fastener by the pressuring member of a press for a certain time period following start of spark so that the metal is made sufficiently molten, thus enabling a strengthening of the joint between the rigid member and the metal base material.

In JP S.61-269986, however, electricity is applied and welding performed after the tip portion of the metal fastener reaches the metal base material, and no heating of the metal fastener is done when the metal fastener is press-fit into the rigid member. Hence, cracking can occur or fissures can enter the rigid member when a metal fastener is press-fit into the rigid member.

Patent Document 2 discloses a stud welding device in which pre-heating and heating burners are attached to the tip-side portion of a welding gun. In Patent Document 2, pre-heating and post-heating of a welding portion during stud welding can be accomplished by a pair of heating burners attached to the tip-side portion of a welding gun, and as there is no sudden heating or sudden cooling, cracking can be prevented and welding work efficiency improved.

The stud welding device of prior art Utility Model JP S.61-82775 heats a member from its surface by a heating burner to weld studs; it does not weld two laminated plate-shaped members.

The device of JP S.61-82775 uses a gas burner as a heating burner and therefore requires a gas cylinder. Further, when two plate-shaped members are welded by the device of JP S.61-82775 U, heating is performed from the top of the upper member; therefore, the lower member is not heated sufficiently, and it is difficult to weld the two plate-shaped members.

Prior art Utility Model JP H.2-93087 discloses a welding machine with which a favorable welding state is obtained by imparting a shock to a welding pin, driving the pin tip into a metal surface. In JP H.2-93087 U, a striking device for imparting a shock to a welding pin is provided; a shock force is imparted to the welding pin, the tip of the welding pin is driven into a metal surface, then electricity is supplied to perform resistance welding. The reference therefore states that good contact between the welding pin tip and the metal surface is achieved, and good welding is performed even if the metal plate surface is coated with insulation or rust.

However, JP H.2-93087 U does not provide for the heating of the welding pin prior to welding. Therefore, if the member covering the metal member is rigid, there is a risk of its cracking when a welding pin is driven into a member on the metal member.

Thus, in JP S.61-269986, resistance welding is performed after the metal fastener contacts the metal base material; the rigid member is not heated when the fastener is press-fit into the rigid member. In JP S.61-82775 U, a steel surface is heated by a heating burner at the time of stud welding; welding of two plate members is not performed. In JP H.2-93087 U, resistance welding is performed after applying a shock to a welding pin to drive it in; as in JP S.61-269986, no heating is performed when the welding pin is driven in.

Therefore, a method, joining structure and joining device with a low tendency to crack resin members and capable of simple joining have been sought.

A joining device and joining method capable of stable joining of a resin member and metal member with high strength have also been sought.

SUMMARY OF INVENTION

The object of the present invention is to provide a joining device and joining method for a resin member and a metal member with which, when joining a resin member and a metal member with a fastener, no operation such as pre-drilling of holes in a resin member and/or metal member is required, and it is unlikely cracks will occur in the resin member.

Another object of the present invention is to provide a joining device and joining method for a resin member and a metal member with which a resin member and a metal member can be simply joined at a high strength.

To achieve the object in the joining method of the present invention, when a fastener is press-fit into a resin member, the fastener is heated by high-frequency induction heating, and after the fastener has contacted the metal part, high-frequency induction heating is completed; the fastener and metal part are welded by resistance welding to join the resin member and the metal part. Since the fastener is heated by high-frequency induction heating, the resin member is heated by the fastener, and the fastener is press-fit with the resin member in a softened or molten state, cracks do not occur in the resin member. After the fastener has contacted the metal part, high strength joining can be performed by welding.

One embodiment of the invention is a joining device for joining a metal member and a resin member using a metal fastener, comprising: a cylindrical nose piece capable of up and down motion; a high-frequency induction coil disposed on the perimeter of the nose piece;

an electrode punch made of a conductor, displaced so as to be movable up and down on the inside of the nose piece; a chopper device for converting inputted power to high-frequency current; a high-frequency induction output device into which high-frequency current is input from the chopper device, and from which high-frequency induction current is sourced to the high-frequency induction coil; a resistance welding output device into which the high-frequency current is input from the chopper device, and a welding current is sourced between the electrode punch and the metal member; a contact sensing device for sensing whether the tip portion of a fastener, press-fit into the resin member, has contacted the metal member; and a switching device for switching between connecting the chopper device to one of either the high-frequency induction output device or the resistance welding output device based on the sensing results from the contact sensing device.

In one mode of the invention, a fastener is made of a conductor; therefore, it is heated by high-frequency induction heating, and the resin member is heated by the fastener.

At the stage where the fastener is press-fit into a resin member, the fastener is high-frequency induction heated, and the resin member is heated by the fastener, softening or melting it; therefore, no cracks in the resin member are produced, and press-fitting can be easily accomplished.

After the fastener contacts the metal member, the fastener and metal member are resistance welded, and are therefore joined at a high strength. Using a switching device, switching between high-frequency induction heating and resistance welding is carried out so that joining can be efficiently performed.

It is preferable for the nose piece to be made of an insulator.

If the nose piece is made of an insulator, it will not be heated by high-frequency induction heating, and the fastener can be efficiently heated by high-frequency induction heating.

It is preferable for the nose piece to have a cylinder-shaped cylindrical portion and a high-frequency induction coil retaining portion for holding the high-frequency induction heating coil outside the end portion of the cylindrical portion, whereby the fastener is retained on the inside of the high-frequency induction coil retaining portion.

Disposition of the high-frequency induction coil on the outside of a cylindrical portion on which a fastener is held results in the high-frequency induction coil being placed in proximity to the fastener so that fastener can be efficiently heated by high-frequency induction heating.

On the inside of the nose piece, it is preferable to have a chuck for holding the fastener flange so that the fastener can be separated by an interval from the fastener and the electrode punch and the resin member top surface.

When the fastener is held at an interval away from the electrode punch, the resin member and the metal member, it is difficult to heat the electrode, while the fastener can be heated by high-frequency induction heating in a focused manner; furthermore, since fastener heat is not transferred to the electrode punch or the resin member, it is difficult for the fastener to cool.

It is preferable to heat the fastener by high-frequency induction heating by sourcing high-frequency induction current to the high-frequency induction coil, thereby softening or melting the resin member joining portion for press-fitting of the fastener into the resin member.

Cracks are unlikely to occur in the resin member when the resin member joining portion is softened or melted and the fastener is press-fit into the resin member.

The melted part of the resin member fuses to the fastener or the metal member, so resin members can be stably joined at a high strength.

It is preferable for the contact sensing device to sense that the tip of the fastener has contacted the metal member by applying a voltage between the electrode punch and the metal member and sourcing a current flowing from the electrode punch through the fastener to the metal member.

By sensing the current flowing from the electrode punch through the fastener to the metal member, contact of the fastener tip portion with the metal member can be easily sensed.

When the contact sensing device senses that the tip portion of the fastener is not contacting the metal member, the switching device switches so that the chopper device and the high-frequency induction output device are connected; and when the contact sensing device senses that the tip portion of the fastener has contacted the metal member, it is preferable for the switching device to switch so that the chopper device and the resistance welding output device are connected.

When the chopper device and the resistance welding output device are connected upon sensing that the fastener tip portion has contacted the metal member, the switch to resistance welding can be made immediately after the fastener tip portion contacts the metal member.

Another mode of the invention is a joining method for joining a resin member and a metal member with a fastener, comprising a stage wherein the metal member and a resin member above it are placed; a cylindrical nose piece and an electrode punch on the inside thereof are prepared; the fastener is disposed on the bottom side of the electrode punch, on the inside of the nose piece; the nose piece and the fastener are brought into contact with the top surface of the resin member; a high-frequency induction current is sourced to a high-frequency induction coil disposed on the outside of the nose piece tip, and the fastener is heated by high-frequency induction heating; the part of the resin member closely proximate to the fastener is softened or melted, and the fastener is press-fitted to the resin member by the electrode punch; whereby when the contact sensing device senses that the fastener tip portion has contacted the metal member, it turns off the high-frequency induction current and sources a resistance welding current flowing from the electrode punch through the fastener to the metal member to resistance weld the fastener tip portion and the metal member; and the resistance welding current is turned off and the melted fastener tip portion and the metal member part are solidified and joined.

In another mode of the present invention, the part where the resin member is joined is heated and softened or melted when the fastener foot portion is press-fit into the resin member, so no cracking occurs in the resin member.

After the tip portion of the fastener has contacted the metal member, a welding current flows through the electrode punch, fastener, and metal member; the fastener tip melts and becomes shorter, hence the fastener sinks into the softened resin member; since welding is performed with sufficient welding material, a sufficiently strong joint strength is obtained.

Still another mode of the invention is a joining method for joining a resin member and a metal member with a fastener, comprising a stage wherein: the metal member and a resin member above it are placed; a cylindrical nose piece, a chuck on the inside of the nose piece and an electrode punch on the inside of the nose piece are prepared; the fastener is held at an interval from the electrode punch and the resin member by the chuck on the lower side of the electrode punch on the inside of the nose piece; a high-frequency induction current is sourced to a high-frequency induction coil disposed on the outside of the nose piece tip, and the fastener is heated by high-frequency induction heating; the nose piece and the fastener are brought into contact with the top surface of the resin member; the part of the resin member closely proximate to the fastener is softened or melted, and the fastener is press-fitted to the resin member by the electrode punch; whereby when the contact sensing device senses that the fastener tip portion has contacted the metal member, it turns off the high-frequency induction current and sources a resistance welding current flowing from the electrode punch through the fastener to the metal member to resistance weld the fastener tip portion and the metal member; and the resistance welding current is turned off and the melted fastener tip portion and the metal member part are solidified and joined.

In still another mode, the fastener is heated by high-frequency induction heating with the fastener separated from the electrode punch, resin member and metal member, making it difficult to heat the electrode punch and metal member by induction heating; since there is no transfer of the fastener heat to the electrode punch or the resin member, it is difficult for the fastener to cool.

Using the present invention, a joining device and joining method for a resin member and a metal member can be obtained with which, when joining a resin member and a metal member with a fastener, no operation such as pre-drilling of holes in a resin member and/or metal member is required, and it is unlikely that cracks will occur in the resin member.

A joining device and joining method capable of joining a resin member and metal member with high strength in a simple manner can also be obtained.

BRIEF DESCRIPTION OF THE DRAWINGS

FIG. 1 is a summary cross section of the joining head in a joining device of a first embodiment of the invention.

FIG. 2 is a front elevation of a fastener according to a first embodiment of the invention.

FIG. 8 is a front elevation of a fastener with the second embodiment male screw portion.

FIG. 9 is a cross section showing the stage in which a fastener having the second embodiment male screw portion is joined to a resin member and a metal member.

FIG. 12 is a summary cross section in which a fastener is set in the joining head of a joining device according to a second embodiment of the invention.

FIG. 13 is a summary cross section showing the stage in which a nose piece, a fastener, and an electrode punch are moved downward from the state shown in FIG. 12, and the nose piece is placed in contact with the resin member surface.

FIG. 14 is a summary cross section showing the stage in which an electrode punch is moved downward on the inside of a nose piece from the state shown in FIG. 13, and the bottom surface of the electrode punch is placed in contact with a fastener flange.

DETAILED DESCRIPTION OF THE PREFERRED EMBODIMENT OF THE INVENTION

Figure 3:
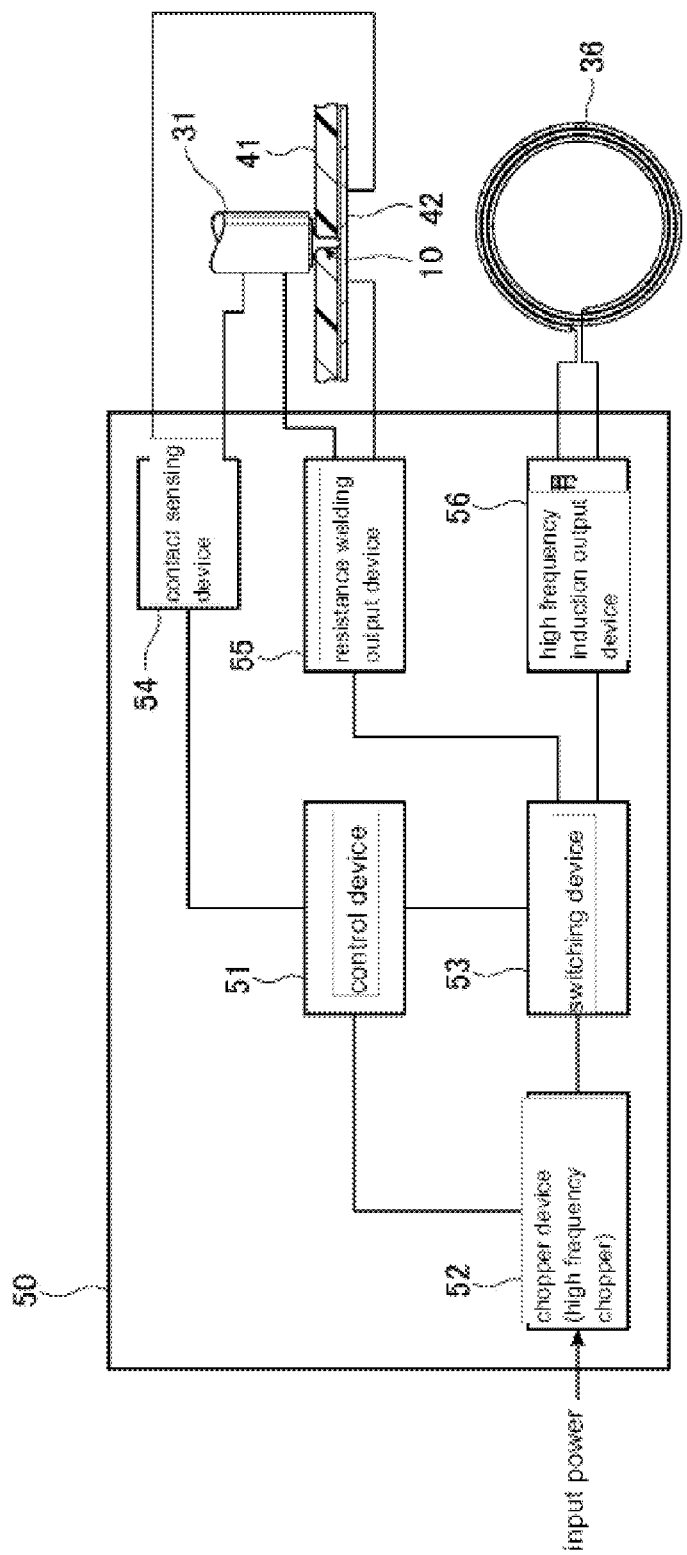
FIG. 3 is a block diagram of the joining machine of the invention.

Below we shall explain a joining device and joining method in which, using a joining device according to a first embodiment of the invention, a fastener is heated by high-frequency induction heating and welded by resistance welding. We shall also explain details of the fastener of the first embodiment.

Note that when explaining embodiments of the invention, we do so referring to the top of FIG. 1 as the up direction.

FIG. 1 is a cross section of the welding head portion, which is part of the joining device 1 of the first embodiment of the present invention. The joining device 1 laminates the resin member 41 and metal member 42, heats a fastener 10 by high-frequency induction heating, press-fitting the fastener 10 into the resin members 41 as it softens and melts the resin member 41. The resistance of the joining device 1 welds the fastener 10 and the metal member 42 when the tip portion 12a of the fastener 10 contacts the metal member 42, joining the resin member 41 and the metal member 42.

The welding head comprises a nose piece 30, a high-frequency coil 36 and an electrode punch 31.

The joining device 1 may also comprise a die to receive the resin member 41 and metal member 42. When using a die, the top surface of the die is a plane for placement of the resin member 41 and metal member 42. Dies are normally made of metal. In an embodiment of the invention, resistance welding is performed under a low applied pressure of about 100N from one side, so a die is not required.

The joined metal member 42 and resin member 41 are overlapped and affixed in a jig.

The metal member 42 may be a weldable metal such as steel, stainless steel, aluminum or alloys thereof. The metal member 42 is often a metal plate. As shown in FIG. 3, a lower electrode 55b for resistance welding is connected to the metal member 42.

The resin member 41 is a thermoplastic resin, which can fuse by melting with the fastener 10 or metal member 42. Thermoplastic resins which can be used include polyacetal, polypropylene resin, polyethylene resin, ABS resin, polycarbonate resin, polyamide resin, etc., or combinations of these resins. The thermoplastic resin may be a fiber reinforced resin such as carbon fiber reinforced plastic (CFRTP), glass fiber reinforced plastic (GFRTP), or the like.

In the carbon fiber-reinforced resin case, because the fastener 10 is susceptible to electrolytic corrosion, electrolytic corrosion of the fastener 10 is prevented either by using corrosion resistant material, or by providing a sacrificial electrode of Zn plating or the like.

A cylindrical nose piece 30 is provided above the resin member 41. The nose piece 30 can be moved up and down; the fastener 10 can be set at an upper position so as to contact the top surface of the resin member 41 at a lower position. The nose piece 30 is made of an insulating body such as ceramic, and is not heated by induction heating. The nose piece 30 has a cylindrical portion 33 with an inside diameter slightly larger than the outside diameter of the electrode punch 31. The nose piece 30 has a high-frequency induction heating coil hold portion made up of a first flange 34 and a second flange 35 on the bottom end outer side of the cylindrical portion 33. The first flange 34 has a larger outside diameter than the cylindrical portion 33 extending to the outside from the bottom end portion of the cylindrical portion 33. The second flange 35 has essentially the same outside diameter as the first flange 34 and is placed with a gap between it and the first flange 34.

A high-frequency induction coil 36 is placed between the first flange 34 and the second flange 35. When a high-frequency induction current flows in the high-frequency induction coil 36, a magnetic field is generated around the fastener 10, and the fastener 10 is heated by high-frequency induction heating by the generated magnetic field.

The nose piece 30 is able to move in the up-down direction using a nose piece 30 movement device (not shown). The nose piece 30 holds down the resin member 41 from above while the fastener 10 is being press-fitted, tightly sealing the resin member 41 to the metal member 42. When the nose piece 30 holds the fastener 10 and the electrode punch 31 on the inside of the nose piece 30 and press-fits the fastener 10, it acts as a guide for the electrode punch 31 and fastener 10.

The electrode punch 31 is disposed on the inside of the cylindrical portion 33 of nose piece 30. The electrode punch 31 is a cylindrical member. The electrode punch 31 acts as an upper electrode 55a, contacting the fastener 10 during resistance welding.

To source resistance welding current, the electrode punch 31 material is a conductive material, such as steel. The electrode punch 31 is able to move in the up-down direction using an electrode punch 31 movement device (not shown). The electrode punch 31 applies a load to the fastener 10 to press it into the resin member 41 and contacts the fastener 10 flange to conduct current for resistance welding.

The fastener 10 is disposed between the electrode punch 31 and resin member 41 on the inside of the nose piece 30. The bottom surface of the electrode punch 31 is brought into contact with the top surface of the fastener 10.

FIG. 2 is a front elevation of a fastener 10 according to a first embodiment of the invention. The fastener 10 is made of a conductive metal such as steel, aluminum or stainless steel, and can be inductively heated.

The fastener 10 is also made of a material which can be welded to the metal member 42. When the metal member 42 is steel, the fastener 10 is also steel. If the metal member 42 is aluminum, the fastener 10 is also aluminum.

The fastener 10 has a disk-shaped flange 11 and a foot portion 12 with an outside diameter smaller than the flange 11, extending downward along the center axis from the flange 11. The tip portion 12a on foot portion 12 of the fastener 10 contacts the top surface of the resin member 41. The tip portion of the foot portion 12 is pointed and is easily able to make a hole in the resin member 41 when pressed into the resin member 41.

The fastener 10 is high-frequency induction heated when press-fitting to the resin member 41. The resin member 41 is heated and softened or melted by the heat of the fastener 10.

FIG. 3 is a block diagram of controls 50 for joining device 1 according to an embodiment of the invention. The welding head portion explained in FIG. 1 is also included in the joining device 1.

A control device 51 controls the up-and-down movement of the nose piece 30 and pressure on the resin member 41, as well as the up-and-down movement of the electrode punch 31 and the pressing of the fastener 10.

The control device 51 controls the AC to DC conversion of input current and the high-frequency conversion by the electronic chopper device 52. Control device 51 controls switching between the resistance welding output device 55 and high-frequency induction output device 56 by the switching device 53, and it controls the voltage, current, and waveform characteristics of the resistance welding output device 55 and the high-frequency induction output device 56.

When heating by high-frequency induction heating, the switching device 53 sends a high-frequency current from the chopper device 52 to the high-frequency induction output device 56, and the high-frequency induction output device 56 supplies high-frequency induction current to the high-frequency induction coil. Appropriate values are set for the high-frequency current frequency, voltage, amperage, and time according to the material characteristics of the resin member, metal member and fastener to be joined.

When resistance welding, the switching device 53 supplies high-frequency current from the chopper device 52 to the resistance welding output device 55, and the resistance welding output device 55 supplies resistance welding current between the electrode punch 31 and the metal member 42. Appropriate values are set for the welding current frequency, voltage, amperage, and time according to the material characteristics of the resin member, metal member and fastener to be joined.

A commercial AC voltage is input to the electronic chopper device 52. There the input commercial AC voltage is converted to DC by a rectifier and is then converted to a frequency far higher than the frequency of a commercial AC voltage by a high-frequency converter such as an inverter. For example, it is converted to a frequency of 10 kHz or greater.

A contact sensing device 54 is connected between the electrode punch 31 and metal member 42. The contact sensing device 54 applies a voltage between the electrode punch 31 and metal member 42 and senses the current flowing between the electrode punch 31 and metal member 42. When the fastener 10 and metal member 42 make contact, a current flows between the electrode punch 31 an electrode and metal member 42; therefore, contact can be sensed. The contact sensing device 54 sends a contact-sensed signal indicating contact to the control device 51 when the fastener 10 and metal member 42 make contact.

The chopper device 52 is connected to the high-frequency induction output device 56 and the resistance welding output device 55 through the switching device 53. The switching device 53 connects the chopper device 52 to the high-frequency induction output device 56 based on a high-frequency induction switching instruction from the control device 51. Alternatively, the chopper device 52 is connected to the resistance welding output device 55 based on a resistance welding switching instruction.

When high-frequency induction switching is instructed, the switching device 53 interrupts the connection between the chopper device 52 and the resistance welding output device 55 and connects the chopper device 52 to the high-frequency induction output device 56.

The high-frequency induction output device 56 includes a high-frequency induction converter and converts the high-frequency induction current from the chopper device 52 to a high-frequency induction current at a voltage appropriate for high-frequency induction heating. A high-frequency induction current then flows in the high-frequency induction coil 36.

Using the control device 51 to adjust the output of the chopper device 52, the characteristics of the high-frequency current from the high-frequency induction output device 56 can be appropriately adjusted for heating.

For example, a relatively small current of 50 to 200 A is sourced from the high-frequency induction output device 56 at a low voltage of 10 to 20V for 15 to 60 seconds. The fastener 10 is heated by high-frequency induction heating.

When the switching device 53 is instructed to switch to resistance welding, the connection between the chopper device 52 and high-frequency induction output device 56 is interrupted, and the chopper device 52 is connected to resistance welding output device 55.

The resistance welding output device 55 includes a resistance welding converter and converts the high-frequency current from the chopper device 52 to a voltage appropriate to resistance welding. A resistance welding current flows between the electrode punch 31 and metal member 42.

Using the control device 51 to adjust the output of the chopper device 52, the resistance welding current from the resistance welding output device 55 can be appropriately adjusted for resistance welding. For example, a current of 5000 to 15000 A at 3 to 5V is sourced from the resistance welding output device 55 for 0.05 to 0.5 seconds.

A welding current detector (not shown) is provided to detect welding current; the welding current is fed back to the control device 51, and the control device 51 can control the operation of the resistance welding output device 55 so that a desired welding current is maintained.

The part joining the tip portion 12*a* of the fastener 10 and the metal member 42 is heated and melted by the welding current, then cooled and hardened to become welded portion 43.

Figure 4:
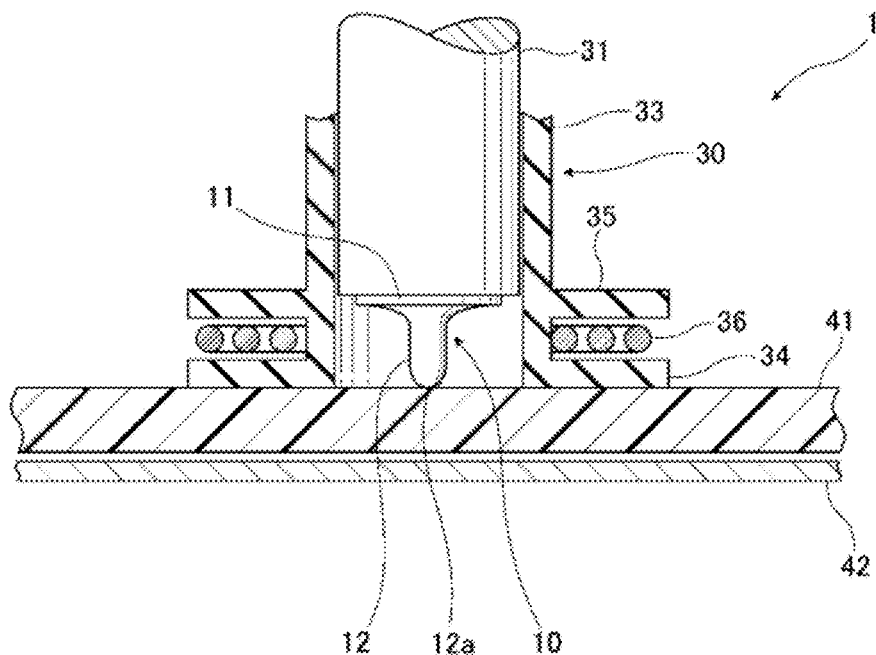
FIG. 4 is a summary cross section in which a fastener is set into the joining device of the first embodiment of the invention, and a nose piece and fastener are set into the top surface of the resin member.
Figure 5:
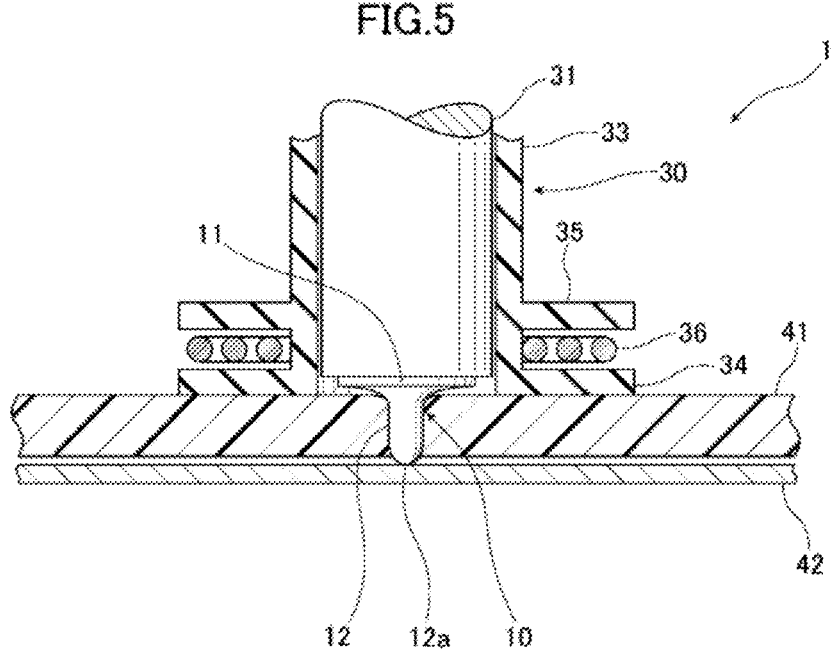
FIG. 5 is a summary cross section showing the stage in which the fastener has been pressed into the resin member from the state of FIG. 4, and the fastener tip portion has reached the metal member.
Figure 6:
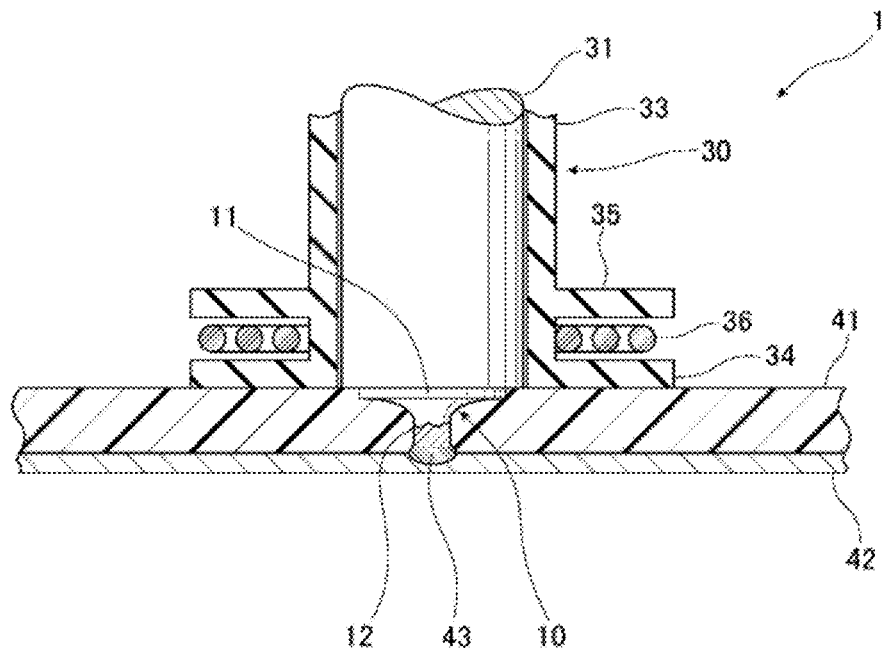
FIG. 6 is a summary cross section showing the stage in which the fastener and the metal member are welded.

Referring to FIGS. 4 through 6, we shall now explain a method for joining the resin member 41 and metal member 42 using the joining device 1 of the first embodiment.

The metal member 42 and resin member 41 are overlaid and affixed in a jig. The nose piece 30 is in a raised position, with a gap opened relative to the resin member 41 (not shown). The bottom surface of the electrode punch 31 is above the bottom surface of the nose piece 30 first flange 34, and fastener 10 can be set at the same height as the nose piece 30 high-frequency induction coil 36.

The fastener 10 is set using a feeder to contact the bottom surface of the electrode punch 31 on the inside of the nose piece 30. A chuck or raised portion (not shown) for holding the fastener 10 flange 11 may also be disposed on the inside of the nose piece 30.

The nose piece 30, electrode punch 31 and fastener 10 are lowered. As shown in FIG. 4, the bottom surface of the nose piece 30 first flange 34 contacts the resin member 41. The tip portion 12*a* of the fastener 10 also contacts the resin member 41. The high-frequency induction coil 36 is disposed around the fastener 10. The electrode punch 31 is positioned on the fastener 10 flange 11, and the electrode punch 31 is held down by a spring (not shown).

The switching device 53 connects the punch device 52 to the high-frequency induction output device 56 based on a high-frequency induction switching instruction from the control device 51. The high-frequency induction output device 56 sources high-frequency current to the high-frequency induction coil 36.

A magnetic field is generated by the current flowing in the high-frequency induction coil 36. The generated magnetic field concentrates in the fastener 10, heating the fastener 10 by high-frequency induction heating. Parts of the resin member 41 near the fastener 10 are therefore heated and softened.

When a hold-down force is applied to the fastener 10 by the electrode punch 31, the foot portion 12 of fastener 10 is press-fit to the resin member 41.

Since the fastener 10 is heated, parts of the resin member 41 contacting the fastener 10 are also heated, and joined parts are softened or melted. The foot portion 12 of fastener 10 can easily enter the interior of the resin member 41, and cracking is unlikely in the resin member 41. As shown in FIG. 5, the foot portion 12 of fastener 10 presses into and opens the resin member 41, penetrating the resin member 41.

The fastener 10 penetrates the resin member 41 and the tip portion 12*a* of fastener 10 contacts the metal member 42. When the tip portion 12*a* of fastener 10 contacts the metal member 42, a detector current flows between the electrode punch 31 and metal member 42. The contact sensing device 54 detects the contact by the tip portion 12*a* of fastener 10 with the metal member 42 by this increase in current and transmits a contact-sensed signal to the control device 51.

The control device 51, based on the received contact-sensed signal, instructs the switching device 53 to switch to resistance welding.

Based on the resistance welding switching signal, the switching device 53 switches the connection between the chopper device 52 and the high-frequency induction output device 56 and connects the chopper device 52 and the resistance welding output device 55. That is, the high-frequency induction output device 56 high-frequency induction current is turned off, and a welding current is supplied from the resistance welding output device 55 through the electrode punch 31, the fastener 10 and the metal member 42.

The joined part between the tip portion 12*a* of fastener 10 and the metal member 42 is heated and melted by the welding current flowing through the tip portion 12*a* of fastener 10 and the metal member 42.

The flange 11 of fastener 10 is pressed onto the resin member 41 and sinks into the resin member 41. The length of the foot portion 12 of fastener 10 is adjusted, and the top surface of the flange 11 becomes coplanar with the top surface of the resin member 41. A state whereby the fastener sinks into the resin member 41 and floats above the top surface of the resin member 41 is also acceptable.

In FIG. 6, etc., the area around the welded portion 43 of fastener 10 is shown in cross section. As shown in FIG. 6, after a pre-determined welding current has flowed, the chopper device 52 turns off and the resistance welding output device 55 turns off, based on an operation stop signal from the control device 51. The temperature drops in the fastener 10 and the resin member 41, which had been heated by resistance welding, and the tip portion 12*a* of fastener 10 and metal member 42, welded by resistance welding, solidify and form a welded portion 43. The softened or melted resin member 41 solidifies, and the resin member 41 and metal member 42 are joined.

Figure 7:
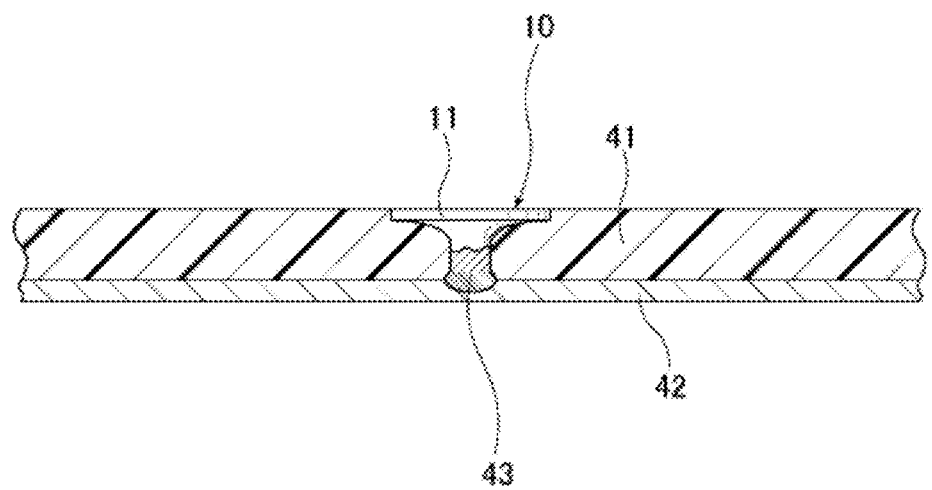
FIG. 7 is a summary cross section showing the stage in which a resin member and metal member joined by a fastener are removed from the joining head of the joining device of the first embodiment.

FIG. 7 is a cross section showing the state in which the electrode punch 31 is moved upward, the nose piece 30 is moved upward and the resin member 41 and metal member 42 joined by the fastener 10 is removed from the joining head on the joining device 1. The metal close to the interface between the tip portion 12*a* of the foot portion 12 of fastener 10 and the metal member 42 melts, then drops in temperature and solidifies, forming a welded portion 43. The joining portion of the resin member 41 is fused to the fastener 10 or the metal member 42.

When the foot portion 12 of fastener 10 is press-fit to the resin member 41, the resin member 41 joining portion is softened and melted; therefore, no cracking of the resin member 41 occurs.

After the tip portion 12*a* of fastener 10 contacts the metal member 42, a welding current flows through the electrode punch 31, fastener 10 and metal member 42, and the tip portion 12*a* of fastener 10 and metal member 42 are welded together, so sufficient joining strength can be obtained.

Next, we shall explain the fasteners in Embodiments 2 through 4. In the fasteners of the second through fourth embodiments, a male screw portion or the like is disposed above the flange. The foot portion on the fastener of the second through fourth embodiments is the same as that of the fastener 10 of the first embodiment.

FIG. 8 is a front elevation of a fastener 20 according to a second embodiment. The flange 21, foot portion 22 and tip portion 22*a* of fastener 20 are the same as in the fastener 10 of the first embodiment. The fastener 20 has a male screw portion 23 above the flange 21. When the fastener 20 of the second embodiment is used, a power punch (not shown) is used, whereby a hole is formed for receiving the male screw portion 23.

FIG. 9 is a front elevation showing the state in which the resin member 41 and metal member 42 are joined by a fastener 20. A male screw portion 23 is vertically disposed above the resin member 41; therefore, other parts can be attached to the male screw portion 23.

Figure 10:
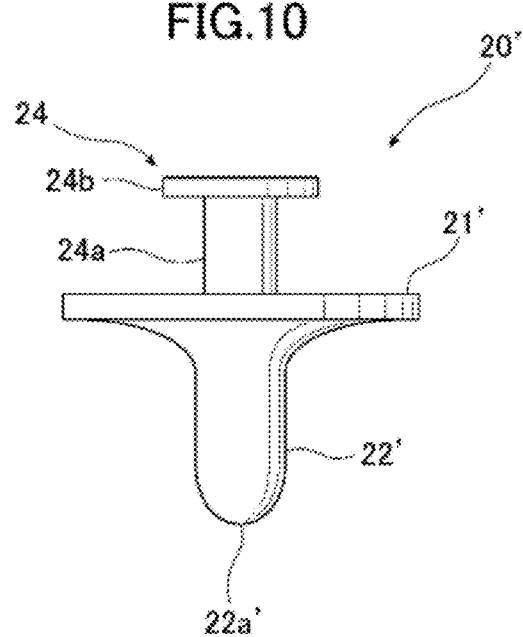
FIG. 10 is a front elevation of a fastener having the third embodiment T stud shape.

FIG. 10 is a front elevation of a fastener 20' according to a third embodiment. The flange 21', foot portion 22' and tip portion 22*a*' of fastener 20' are the same as in the fastener 10 of the first embodiment. The fastener 20' has a T stud-shaped portion 24 above the flange 21'. The T stud-shaped portion 24 has a cylindrical portion 24*a* extending as a cylinder from the flange 21' and an expanded head portion 24*b*, adjacent to the cylindrical portion 24*a*, with a larger diameter than the cylindrical portion 24*a*. When the third embodiment fastener 20' is used, a power punch (not shown) is used; whereby, a hole is formed for receiving the T stud-shaped portion 24. Other parts can be attached to the T stud-shaped portion 24.

Figure 11:
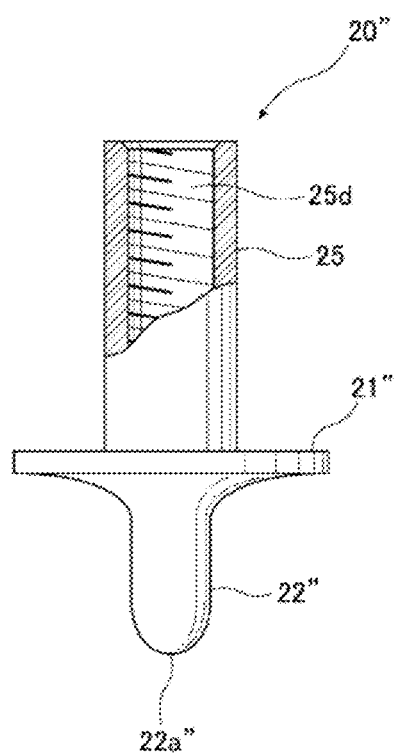
FIG. 11 is a front elevation of a fastener with the fourth embodiment female thread portion.

FIG. 11 is a front elevation of a fastener 20" according to a fourth embodiment. The flange 21", foot portion 22" and tip portion 22*a*" of the fastener 20" are the same as in the fastener 10 of the first embodiment. The fastener 20" has a female screw portion 25 above the flange 21". The female screw portion 25 is cylindrical, and a female thread 25*d* is formed on the inside thereof. When the fourth embodiment fastener 20" is used, a power punch (not shown) is used; whereby, a hole is formed for receiving the female screw portion 25. A bolt can be screwed into the female screw portion 25 and other parts attached.

Using the first embodiment of the invention, when the fastener 10 is heated and press-fitted using high-frequency induction heating, the joined part of the resin member 41 is heated and softened or melted by the heated fastener 10. By press-fitting the fastener 10 with the resin member 41 softened or melted, there will be no breakage of the resin member 41.

When the tip portion 12*a* of the fastener 10 contacts the metal member 42, welding current flows to the fastener 10 and the metal member 42, and the fastener 10 tip portion 12*a* and metal member 42 are welded. The resin member 41 is fused and joined, so a high strength joint is obtained.

Next, we shall explain a joining device 2 according to a second embodiment of the invention. FIG. 12 is a cross section of the welding head portion, which is part of the joining device 2 of the second embodiment of the present invention. The welding head of the joining device 2 in the second embodiment, as in the joining device 1 of the first embodiment, comprises a nose piece 30, an electrode punch 31 and a high-frequency induction coil 36. The electrode punch 31 acts as an upper electrode 55*a* for resistance welding.

In addition, the joining device 2 of the second embodiment has a chuck 37 on the inside of the nose piece 30 cylindrical portion 33. The chuck 37 is able to hold the fastener 10, separated by an interval from the electrode punch 31.

We previously explained the case in which the fastener 10 of the first embodiment is used, but it is also possible to use the fasteners 20, 20' and 20" of Embodiments 2 through 4 in the joining device 2 of the second embodiment.

The joining device 2 may also comprise a die to receive the resin member 41 and metal member 42. It is also acceptable that there not be a die. The metal member 42 and resin member 41 for joining are overlapped and affixed in a jig. A lower electrode for resistance welding is connected to the metal member 42.

A cylindrical nose piece 30 is positioned above the resin member 41, separated from the resin member 41 by an interval. The nose piece 30 comprises a cylindrical portion 33 and a high-frequency induction coil holding portion made up of a first flange 34 and second flange 35 on the bottom end outer side of the cylindrical portion 33. The nose piece 30 is made of an insulating body such as ceramic. A high-frequency induction coil 36 is disposed between the first flange 34 and the second flange 35.

The chuck 37 is disposed on the inside of the cylindrical portion 33 of nose piece 30. The chuck 37 is a plate-shaped member, elongated in a vertical direction, disposed in multiple at positions facing the center axis on the inside of the cylindrical portion 33. The chuck(s) 37 may also curve along the outside diameter of the electrode punch 31.

The top end portion 37a of the chuck 37 is pivot-connected to the inside of the cylindrical portion 33, and the bottom end portion 37b can be rotated toward the center axis. The bottom end portion 37b is biased so that the interval becomes narrower toward the center axis.

The chuck 37 bottom end portion 37b is able to hold the fastener 10 flange 11 from the outside perimeter. A groove for holding the fastener 10 flange 11 may also be disposed on the bottom end portion 37b of the chuck 37. Using the chuck 37, with the flange 11 of fastener 10 being held from the outside perimeter, the foot portion 12 of fastener 10 comes to the same height as the high-frequency induction coil 36. The flange 11 of fastener 10 is separated by an interval from the bottom end portion of the electrode punch 31.

When the electrode punch 31 is at an upper position, the bottom end portion of the electrode punch 31 is positioned in a part close to the top end portion 37a on the chuck 37. When the electrode punch 31 moves downward relative to the nose piece 30, the bottom end portion of the electrode punch 31 pushes open the chuck 37, and the bottom end portion 37b of chuck 37 ceases to hold the flange 11 of fastener 10. In addition, when the electrode punch 31 moves downward, the bottom surface of the electrode punch 31 contacts the top surface of the flange 11.

In the state of FIG. 12, the tip portion 12a of fastener 10 has essentially the same height as the first flange 34 on the nose piece. The flange 11 of fastener 10 is separated by an interval from the bottom end portion of the electrode punch 31. The fastener 10 is separated from the metal member 42. When the fastener 10 is inductively heated by sourcing current to the high-frequency induction coil 36 with the fastener 10 separated from the electrode punch 31 and metal member 42, it is difficult for the electrode punch 31 and metal member 42 to be inductively heated, and the fastener 10 can be efficiently inductively heated.

Referring to FIGS. 12 through 17, we shall now explain a method for joining the resin member 41 and metal member 42 using the joining device 2 of the second embodiment.

As explained above, FIG. 12 is a summary cross section of the state in which the first embodiment fastener 10 is set in the joining device 2.

The metal member 42 and resin member 41 are overlapped. The nose piece 30 is disposed above, separated by an interval from the resin member 41. The bottom end portion 37b of chuck 37 holds the flange 11 of fastener 10 from the outside perimeter. The foot portion 12 of fastener 10 is at essentially the same height as the high-frequency induction coil 36. The tip portion 12a of fastener 10 is at essentially the same height as the bottom surface of the first flange 34.

The bottom end portion of the electrode punch 31 is positioned in a part close to the top end portion 37a of chuck 37. An interval is open between the electrode punch 31 bottom surface and the flange 11 of fastener 10.

In the state of FIG. 12, a high-frequency induction heating current is sourced to the high-frequency induction coil 36, heating the fastener 10 by induction heating. The electrode punch 31, resin member 41 and metal member 42 are separated from the high-frequency induction coil 36, and are therefore difficult to heat by induction heating, while the fastener 10 can be efficiently heated by induction heating. The fastener 10 heat does not transfer to the electrode punch 31 or the resin member 41, so it is difficult for the heated fastener 10 to cool.

While sourcing high-frequency induction current to the high-frequency induction coil 36, the nose piece 30, fastener 10, chuck 37 and electrode punch 31 are moved as a single piece downward without changing their relative positions. As shown in FIG. 13, the bottom surface of the first flange 33 on the nose piece 30 contacts the top surface of the resin member 41. In addition, the tip portion 12a on foot portion 12 of the fastener 10 contacts the top surface of the resin member 41.

When the bottom surface of the first flange 33 on the nose piece 30 contacts the top surface of the resin member 41 and the tip portion 12a of fastener 10 contacts the top surface of the resin member 41, the nose piece 30 and the fastener 10 do not move downward beyond that position.

The electrode punch 31 is made to move downward on the inside of the nose piece 30. The chuck 37 is pushed and widened, and the top end portion 37a of chuck 37 ceases to hold the flange 11 of fastener 10. As shown in FIG. 14, the bottom surface of the electrode punch 31 contacts the top surface of the flange 11 of fastener 10.

When a hold-down force is applied to the fastener 10 by the electrode punch 31, the foot portion 12 of fastener 10 is press-fit to the resin member 41.

Figure 15:
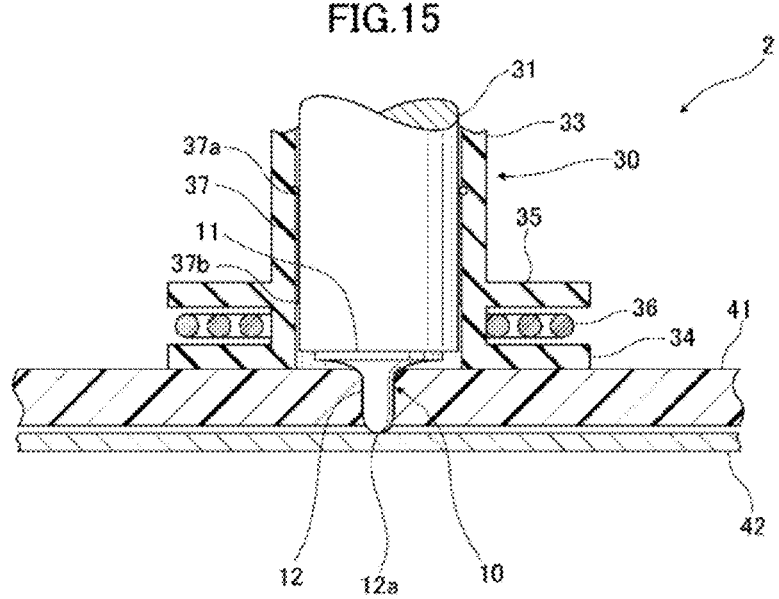
FIG. 15 is a summary cross section showing the stage in which the fastener has been pressed into the resin member from the state of FIG. 14, and the tip portion has reached the metal member.

Since the fastener 10 is heated, parts of the resin member 41 contacting the fastener 10 are also heated, and are softened or melted. As shown in FIG. 15, the foot portion 12 of the fastener 10 presses into and opens the resin member 41, penetrating the resin member 41.

When the tip portion 12a of the fastener 10 contacts the metal member 42, a current flows between the electrode punch 31 and metal member 42. The contact sensing device 54 detects the contact by the tip portion 12a of fastener 10 with the metal member 42 by this increase in current and transmits a contact-sensed signal to the control device 51.

In other words, the high-frequency induction current from the high-frequency induction output device 56 is turned off, and a welding current is sourced from the resistance welding output device 55 through the electrode punch 31, fastener 10 and metal member 42.

The welded part between the tip portion 12a of fastener 10 and the metal member 42 is resistance heated and melted by the welding current flowing through the tip portion 12a of fastener 10 and the metal member 42.

The flange 11 of fastener 10 is pressed onto the resin member 41 and sinks into the resin member 41.

Figure 16:
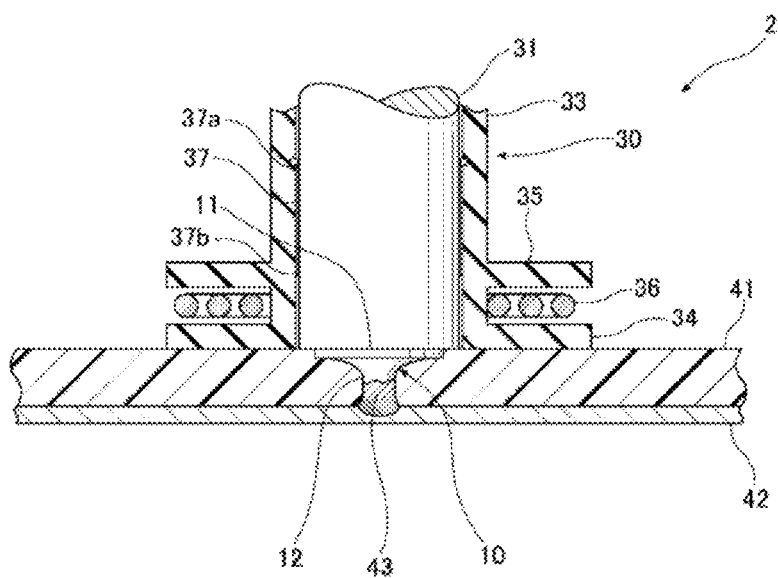
FIG. 16 is a summary cross section showing the stage in which the fastener and the metal member are welded.

As shown in FIG. 16, after a pre-determined welding current has flowed, the current from the resistance welding output device 55 is stopped, based on an instruction from the control device 51. The temperature drops in the fastener 10 and the resin member 41, which had been heated by resistance welding, and the tip portion 12a of fastener 10 and metal member 42 welded by resistance welding solidify, forming a welded portion 43. The softened or melted resin member 41 solidifies, and the resin member 41 and metal member 42 are joined.

Figure 17:
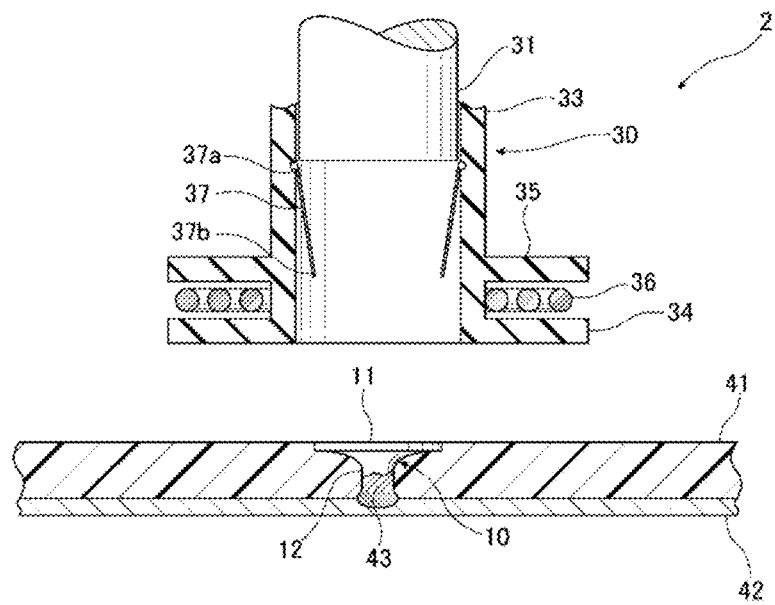
FIG. 17 is a summary cross section showing the stage in which the nose piece and the electrode punch move upward from the state of FIG. 16, and the resin member and metal member joined by a fastener are removed from the joining head of the joining device.

FIG. 17 is summary cross section showing the state wherein, as in FIG. 16, after the resin member 41 and metal member 42 are welded by the fastener 10, the electrode punch 31 moves upward, the electrode punch 31 moves upward, and the resin member 41 and metal member 42 are removed from the joining head. Metal near the interface between the tip portion 12a of the foot portion 12 of fastener 10 and the metal member 42 melts, then drops in temperature and solidifies, forming a welded portion 43. The joining portion of the resin member 41 is fused to the fastener 10 or the metal member 42.

Figure 18:
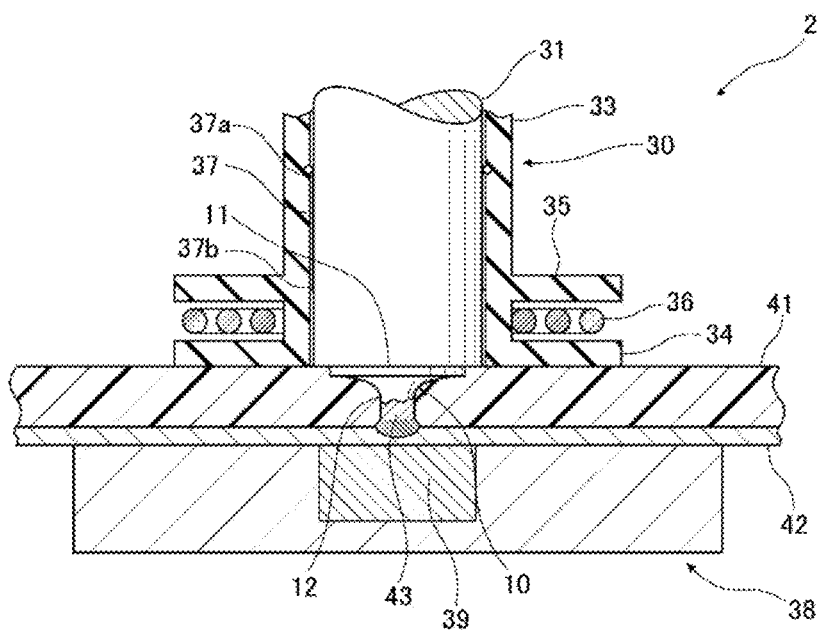
FIG. 18 is a summary cross section showing a variant example of the joining head part of a second embodiment joining device.

FIG. 18 is a summary cross section showing a variant example 2' of the joining head part of a second embodiment joining device. FIG. 18 shows a stage corresponding to FIG. 16. In the second embodiment, a lower electrode for sourcing welding current is disposed at a position separated from the part where welding is performed on the bottom surface of the metal member. In the variant example 2" of FIG. 18, the lower electrode 39 is disposed immediately below the part where the metal member is welded. The perimeter of the lower electrode 39 is a die 38 for receiving the metal member 42.

In a second embodiment of the invention, the fastener 10 is high-frequency induction heated with the fastener 10 separated from the electrode punch 31 and the metal member 42. Therefore, the electrode punch 31, resin member 41 and metal member 42 are difficult to heat by induction heating, and the fastener 10 can be efficiently heated by induction heating; since the heat of the fastener 10 is not transferred to the electrode punch 31 or the resin member 41; it is difficult to cool the fastener 10.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A joining device for joining a metal member and a resin member using a metal fastener that penetrates the resin member and fuses to the metal member, the metal fastener including a tip, and the joining device comprises:
   a cylindrical nose piece operable for up and down movement;
   a high-frequency induction heating coil disposed around the nose piece;
   an electrode punch operable for up and down movement inside of the nose piece and for conducting a welding current;
   a high frequency electronic chopper device operable for converting an input power into one of a welding current and an induction heating current;
   a high-frequency induction output device operable for receiving the induction current from the chopper device, and for supplying the induction current to the high-frequency induction heating coil;
   a resistance welding output device operable for receiving welding current from the chopper device and supplying welding current between the electrode punch and the metal member; and
   wherein the tip portion of the fastener penetrating the resin member and contacting the metal member is sensed; and
   wherein a connection of the chopper device is switched from the high-frequency induction output device to the resistance welding output device after contact of the tip portion of the fastener with the metal member is sensed.

2. The joining device of claim 1, wherein the nose piece is made of an insulator.

3. The joining device of claim 1, wherein the nose piece includes a cylindrical portion and a high-frequency induction coil retaining portion holding the high-frequency induction heating coil radially outside the cylindrical portion, and the nose piece is operable for releasably retaining the fastener radially inward of the high-frequency induction coil retaining portion.

4. The joining device of claim 1, further comprising a chuck operable for holding the fastener on the inside of the nose piece and between the electrode punch and the resin member.

5. The joining device of claim 1, wherein:
   the high-frequency induction output device is operable to inductively heat the fastener in the nose piece by supplying the high-frequency induction current to the high-frequency induction coil, and
   the electrode punch is operable to drive the heated fastener into and through the resin member which is softened and melted by the heated fastener.

6. The joining device of claim 1, wherein contact of the tip of the fastener with the metal member is sensed by applying a voltage between the electrode punch and the metal member and sensing when a current flows from the electrode punch through the fastener to the metal member.

7. The joining device of claim 6, wherein:
   when the tip portion of the fastener is not contacting the metal member, the chopper device is connectable to the high-frequency induction output device; and
   when the tip portion of the fastener has contacted the metal member, the chopper device is connectable to the resistance welding output device.

8. A method for joining a metal member and a resin member using a fastener including a tip, the method comprising the steps of:
   placing the resin member above the metal member;
   placing the fastener within a cylindrical nose piece and under an electrode punch and above the resin member;
   lowering the nose piece and the fastener into contact with the resin member;
   supplying a high-frequency induction current to a high-frequency induction coil disposed radially around the nose piece,
   heating the fastener tip by high-frequency induction heating;
   softening the resin member by heating proximate to the fastener tip;
   lowering the electrode punch and pushing the fastener through the softened resin member;
   sensing with a contact sensing device when the fastener tip contacts the metal member;
   turning off the high-frequency induction current upon sensing that the fastener tip has contacted the metal member;
   supplying a welding current to flow via the electrode punch through the fastener to the metal member;
   welding the fastener tip to the metal member; and
   turning off the welding current and allowing the melted fastener tip and the metal member to cool and fuse.

9. A method for joining according to claim 8, wherein the step of placing the fastener within a cylindrical nose piece and under an electrode punch and above the resin member further includes a sub-step of releaseably holding the fastener with a chuck.

10. A joining device for joining a metal member and a resin member using a metal fastener that penetrates the resin member and fuses to the metal member, the metal fastener including a tip, and the joining device comprises:
- a cylindrical nose piece operable for up and down movement;
- a high-frequency induction heating coil disposed around the nose piece;
- an electrode punch operable for up and down movement inside of the nose piece and for conducting a welding current;
- a high frequency electronic chopper device operable for converting an input power into one of a welding current and an induction heating current;
- a high-frequency induction output device operable for receiving the induction current from the chopper device, and for supplying the induction current to the high-frequency induction heating coil;
- a resistance welding output device operable for receiving welding current from the chopper device and supplying welding current between the electrode punch and the metal member;
- a contact sensor between the metal member and the electrode punch and sending an output signal when the tip portion of the fastener has penetrated the resin member and contacted the metal member; and
- a switch connected to the chopper device for supply of electric power and selectively connectable to one load of either the high-frequency induction output device or the resistance welding output device based on the output signal from the contact sensor.

11. The joining device of claim 10, wherein the nose piece is made of an insulator.

12. The joining device of claim 10, wherein the nose piece includes a cylindrical portion and a high-frequency induction coil retaining portion holding the high-frequency induction heating coil radially outside the cylindrical portion, and the nose piece is operable for releasably retaining the fastener radially inward of the high-frequency induction coil retaining portion.

13. The joining device of claim 10, further comprising a chuck operable for holding the fastener on the inside of the nose piece and between the electrode punch and the resin member.

14. The joining device of claim 10, wherein:
- the high-frequency induction output device is operable to inductively heat the fastener in the nose piece by supplying the high-frequency induction current to the high-frequency induction coil, and
- the electrode punch is operable to drive the heated fastener into and through the resin member which is softened and melted by the heated fastener.

15. The joining device of claim 10, wherein the contact sensor senses that the tip of the fastener has contacted the metal member by applying a voltage between the electrode punch and the metal member and sensing when a current flows from the electrode punch through the fastener to the metal member.

16. The joining device of claim 15, wherein:
- when the contact sensor senses that the tip portion of the fastener is not contacting the metal member, then the switching device is operable to connect the chopper device and the high-frequency induction output device; and
- when the contact sensor senses that the tip portion of the fastener has contacted the metal member, then the switching device is operable to connect the chopper device and the resistance welding output device.

* * * * *